(12) United States Patent
Uneme

(10) Patent No.: US 6,209,414 B1
(45) Date of Patent: Apr. 3, 2001

(54) CABLE END STRUCTURE FOR PULL-CABLE

(75) Inventor: Masato Uneme, Nagoya (JP)

(73) Assignee: Chuohatsujo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/329,731

(22) Filed: Jun. 10, 1999

(30) Foreign Application Priority Data

Jun. 12, 1998 (JP) .................................................. 10-181609

(51) Int. Cl.[7] ....................................................... F16C 1/10
(52) U.S. Cl. ........................................ 74/502.4; 74/502.6
(58) Field of Search .............................. 74/502.6, 502.4

(56) References Cited

U.S. PATENT DOCUMENTS

| | | | | |
|---|---|---|---|---|
| 4,738,155 | * | 4/1988 | Stocker | 74/502.6 |
| 5,570,611 | * | 11/1996 | Pospisil et al | 74/502.6 |
| 5,579,663 | * | 12/1996 | Likich et al. | 74/502.4 |

* cited by examiner

*Primary Examiner*—Sherry Estremsky
(74) *Attorney, Agent, or Firm*—Lackenbach Siegel

(57) ABSTRACT

An improved cable end structure, including a guide member 5 comprising a plate-like portion 7 disposed between the cable end device b and the cushion 3, and a tubular portion 6 formed integrally with the plate-like portion 6 so that the guide member 5 may prevent the pull-cable a from contacting the cushion 3. The plate-like portion 7 is disposed between the cable end device b and the cushion 3 which allows the tubular portion 6 to be held in the cushion 3 and the tubular portion 6, in turn, prevents the pull-cable a from contacting and abrading the cushion 3.

5 Claims, 1 Drawing Sheet

CABLE END STRUCTURE FOR PULL-CABLE

BACKGROUND OF THE INVENTION

1. Field of the Invention

This invention relates to a cable and structure for a pull cable and particularly to such cable end structure for a rocking end such as a pedal side end of car's accelerator cable.

2. Description of the Prior Art

Conventionally, on the pedal side end of car's accelerator cable, the cushion is disposed between the pedal and the cable end device in order to absorb a vibration of the engine. However, a rocking movement of the pedal causes the cable end device to be obliquely pressed against the cushion.

Consequently, the accelerator cable comes in direct contact with the cushion and stretch and contraction of the cushion causes the accelerator cable to rub the cushion which is thereby abraded. These problems have made it difficult to improve a durability of the cable end structure.

SUMMARY OF THE INVENTION

This invention aims to solve these problems left behind by the prior art unsolved.

The object set forth above is achieved by an end structure of a pull-cable used to mount a cable end device on a fixture having a cushion disposed between said cable end device and said fixture. The end structure has a guide member comprising a plate-like portion disposed between said cable end device and said cushion and a tubular portion formed integrally with said plate-like portion. The plate-like portion is disposed between the cable end device and the cushion allows the tubular portion to be held in the cushion and said tubular portion, in turn, prevents the pull-cable from contacting and abrading the cushion. In addition, the tubular portion may be somewhat rigid so as to avoid buckling of the cushion and thereby improve its durability. The invention is also designed so that the cable end device and the plate-like portion forming part of the guide member are tightly engaged with each other. With such arrangement, it is ensured that the cable end device is maintained in concentric alignment with the guide member and thereby said tubular portion can smoothly guide the pull-cable. The invention further discloses that the guide member is made of a material having a flexibility corresponding to a flexural elasticity modulus of 500~10,000 kgf/cm². With such arrangement, both the plate-like portion and the tubular portion of the guide member can have sufficient flexibility to prevent the pull-cable from biting into said tubular portion which thereby improves durability of the pull-cable.

DESCRIPTION OF THE PREFERRED EMBODIMENT

Figure 1:
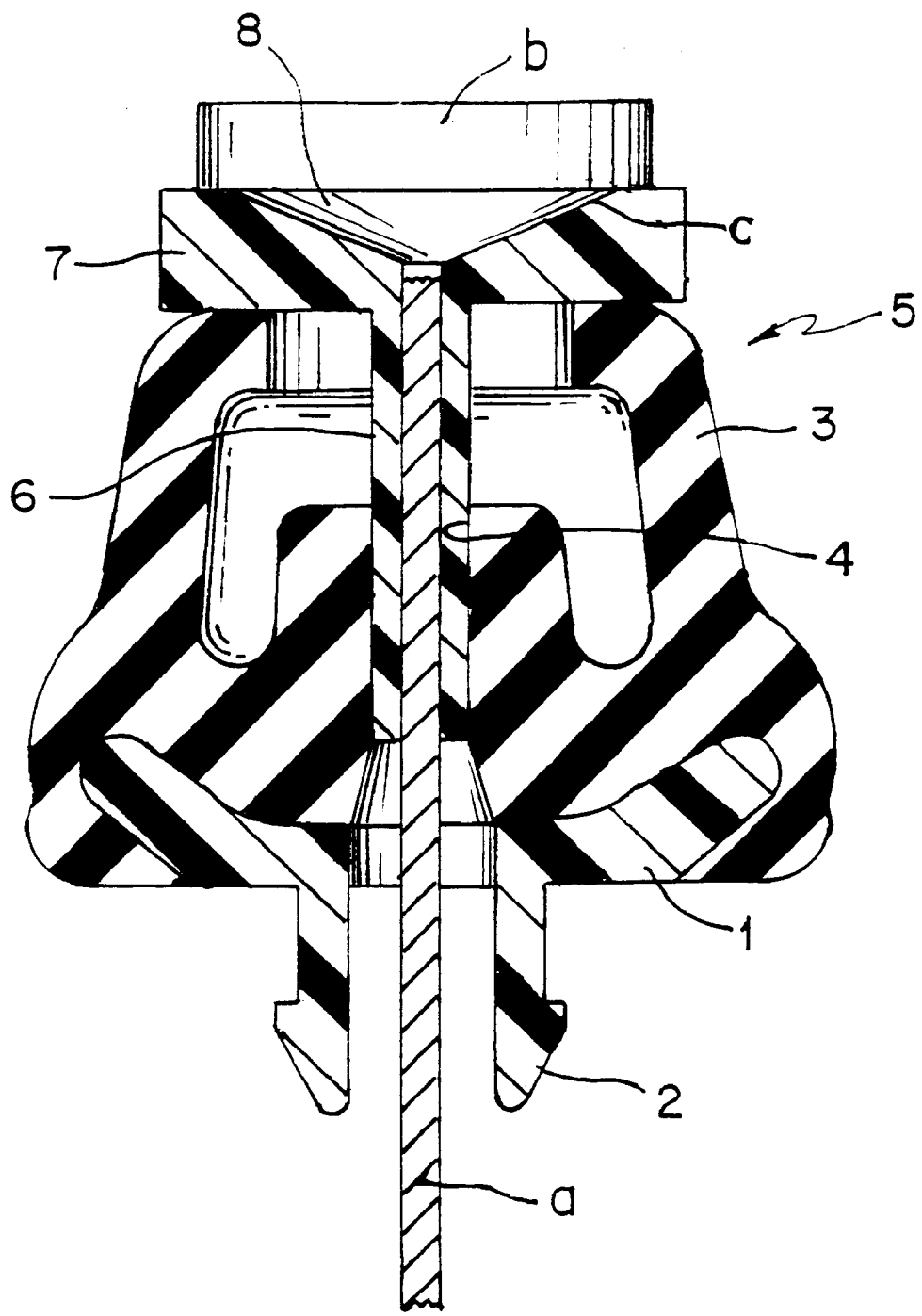
FIG. 1 is a sectional view showing one preferred embodiment of the invention.

One preferred embodiment of this invention will be described in details hereunder in reference with the accompanying drawing.

Referring to FIG. 1, reference numeral 1 designates a fixture having an elastic hook member 2 adapted to be snap-fitted on an opposite member such as an accelerator pedal characterized by its rocking movement. The fixture 1 is provided on its rear end with a rubber cushion 3 having an axial through-hole 4.

Reference numeral 5 designates a guide member made of synthetic resin such as polyester elastomer which is high in its flexibility as well as its abrasion resistance. The guide member 5 integrally comprises a tubular portion 6 adapted to be tightly inserted into the axial through-hole 4 of the cushion 3 and a plate-like portion 7 adapted to be placed against a rear end surface of the cushion 3. Said plate-like portion 7 is formed on its rear end surface with a conical concave 8.

Reference symbol $\underline{a}$ designates a pull-cable such as an accelerator cable which is slidably passed through said tubular portion 6 of the guide member 5 and provided at its end with a metallic cable end device $\underline{b}$ integrally fixed thereto by a die casting process.

Inner end surface of the cable end device $\underline{b}$ is formed with a conical convex $\underline{c}$ adapted to be tightly engaged with the concave 8 of the guide member 5.

With such arrangement according to this preferred embodiment, when a tractive force is obliquely exerted on the pull cable $\underline{a}$, the concave 8 is maintained in tight engagement with the convex $\underline{c}$ and thereby the cable end device $\underline{b}$ is maintained in concentric alignment with said plate-like portion 7 of the guide member 5 At the same time, the pull-cable $\underline{a}$ is pressed against the inner surface of said tubular portion 6 of the guide member 5, thereby the cushion 3 is elastically compressed and, upon being released from the tractive force, the cushion 3 is restored again to its initial shape. In this manner, the pull-cable $\underline{a}$ repeatedly rubs the inner surface of the tubular portion 6 of the guide member 5.

However, the guide member 5 is sufficiently abrasion-resistant to protect the inner surface of its tubular portion 6 from being prematurely abraded and therefore the device of the invention is very useful for a long period of time.

It should be noted that an excessively high flexural elasticity modulus of the guide member 5 will decrease flexibility of said tubular portion 6 relative to said plate-like portion 7 with the result that said tubular portion 6 can no longer follow a rocking movement of the pull-cable $\underline{a}$. In such situation, the breakage-resistance of the pull-cable $\underline{a}$ will decrease to less than 600,000 repetitions of said rocking movement.

On the contrary, an excessively low flexural elasticity modulus of the guide member 5 will cause the pull-cable $\underline{a}$ to bite into the tubular portion 7 and thereby be deformed resulting in that its breakage-resistance will decrease to only about 200,000~300,000 repetitions of said rocking movement. In view of this, it is preferred to select the flexural elasticity modulus of the guide member 5 within a range of 500=10,000 kgf/cm².

It should be understood that this invention is applicable not only for the accelerator cable but also applicable for the other types of pull-cable and particularly suitable for a pull-cables of a relatively small diameter which is correspondingly liable to be affected by a high interfacial contact pressure.

What is claimed is:

1. An improved long-life end structure of a pull-cable used to mount a cable end device on a fixture with the interposition of a cushion disposed between said cable end device and said fixture, said end structure including a guide member comprising a plate-like portion disposed between said cable end device and said cushion, and a tubular portion integrally made with said plate-like portion so that said guide member aids in preventing said pull-cable from contacting said cushion;

whereby said cushion cannot be separated from the fixture should the cable go slack, and wherein said guide member is made of a thermoplastic elastomer having a flexural modulus of about 500 to 10,000 kgf/cm$^2$, so that said guide member and said tubular portion when rocked with respect to each other in use, endures about 600,000 cycles of such rocked movement.

2. End structure of a pull-cable according to claim 1, wherein said thermoplastic elastomer is a polyester elastomer.

3. End structure of a pull-cable according to claim 1, or 2 wherein said cable end device and said plate-like portion forming part of said guide member are tightly engaged with each other.

4. End structure of a pull-cable according to claim 3, wherein said fixture is integrally joined to said cushion.

5. End structure of a pull-cable according to claim 1, wherein said fixture is integrally joined to said cushion.

* * * * *